United States Patent
Tazzari et al.

(10) Patent No.: US 8,649,336 B2
(45) Date of Patent: Feb. 11, 2014

(54) METHOD FOR ASSIGNING ADDRESSES TO A PLURALITY OF ELECTRONIC DEVICES CONNECTED TO A COMMUNICATION CHANNEL

(75) Inventors: Davide Tazzari, Arezzo (IT); Filippo Vernia, La Spezia (IT)

(73) Assignee: Power-One Italy S.p.A., Arezzo (IT)

( * ) Notice: Subject to any disclaimer, the term of this patent is extended or adjusted under 35 U.S.C. 154(b) by 688 days.

(21) Appl. No.: 12/812,835

(22) PCT Filed: Jan. 14, 2008

(86) PCT No.: PCT/IT2008/000020
§ 371 (c)(1),
(2), (4) Date: Nov. 2, 2010

(87) PCT Pub. No.: WO2009/090675
PCT Pub. Date: Jul. 23, 2009

(65) Prior Publication Data
US 2011/0040859 A1    Feb. 17, 2011

(51) Int. Cl.
*H04B 7/212* (2006.01)
(52) U.S. Cl.
USPC ............................ 370/329; 370/337; 370/347

(58) Field of Classification Search
USPC .................................. 370/328, 329, 337, 347
See application file for complete search history.

(56) References Cited

U.S. PATENT DOCUMENTS

| | | | |
|---|---|---|---|
| 5,016,162 A | 5/1991 | Epstein et al. | |
| 2004/0228281 A1* | 11/2004 | Rakotoarivelo et al. | 370/252 |
| 2005/0223147 A1* | 10/2005 | Hellwig et al. | 710/110 |
| 2006/0123168 A1* | 6/2006 | Lang | 710/110 |
| 2006/0203796 A1* | 9/2006 | Morris | 370/346 |
| 2007/0294443 A1* | 12/2007 | Berenbaum et al. | 710/104 |
| 2009/0144471 A1* | 6/2009 | Lin | 710/110 |
| 2009/0177823 A1* | 7/2009 | Chao | 710/110 |
| 2010/0070666 A1* | 3/2010 | Brindle | 710/117 |

* cited by examiner

*Primary Examiner* — Andrew Lee
(74) *Attorney, Agent, or Firm* — Waddey Patterson; Mark J. Patterson

(57) ABSTRACT

A method is described for assigning addresses to a plurality of electronic devices connected to a shared communication channel, in which, upon being turned on, each device generates and assigns itself an address included in a set containing a number of addresses that is equal to or greater than the number of devices connected to said channel.

20 Claims, 3 Drawing Sheets

|  | Column 00 | Column 01 | Column 10 | Column 11 |
|---|---|---|---|---|
| Row 00 | Device 0000 | Device 0001 | Device 0010 | Device 0011 |
| Row 01 | Device 0100 | Device 0101 | Device 0110 | Device 0111 |
| Row 10 | Device 1000 | Device 1001 | Device 1010 | Device 1011 |
| Row 11 | Device 1100 | Device 1101 | Device 1110 | Device 1111 |

FIG. 1 (State of the Art)

Corrupted message

Non-transmitted message

METHOD FOR ASSIGNING ADDRESSES TO A PLURALITY OF ELECTRONIC DEVICES CONNECTED TO A COMMUNICATION CHANNEL

TECHNICAL FIELD

The present invention relates to the field of the management of network devices, connected to a communication channel. More in particular, the present invention relates to innovations to the methods for assigning addresses for the communication of information to electronic devices networked to a communication channel, through which the devices communicate with each other and/or with a master device.

BACKGROUND OF THE INVENTION

Typically, in energy stations and in any system in which a plurality of electronic devices wired on a shared communication line (e.g., RS485) is present, there is the need to provide each device with an address, in order to communicate with the devices, selectively addressing messages to the various devices, and to recognize from which device a message was generated on the communication line.

Within the present description and the appended claims, though in some cases reference is made to a wired communication channel, it must be understood that the term "communication channel" can mean any type of channel able to allow the transmission of information from and to said devices. In some cases, an operator will use this address to interrogate and identify each individual device.

It is obvious that in the same network there cannot be two or more devices with the same address, because this conflict would prevent a controller from correctly managing the entire set and, moreover, communication could be compromised (to a single request, multiple devices with the same address would respond simultaneously).

Generally, the set of devices is mounted in a rack. Each compartment of the rack, among other things, presents a hardware interface (dip-switch, analogue line or another one) from which the device retrieves the address in static manner. In this way, the address also identifies the position in the rack. The device recognizes its own address and acquires it when, after being inserted in the rack, it is turned on and it reads the information provided by the hardware interface.

FIG. 1 shows a grid of rows and columns, each numbered with a two-digit numeric code in the binary system. Said grid can represent the set of the housings of a rack. Thus, each housing is identified by four digits: the two digits that indicate the row and the digits that indicate the column, whose intersection defines the individual housing of the rack. Each device or unit then assumes the generic address ABab, where AB are the digits that indicate the row and ab are the digits that indicate the column of the housing in which the device is inserted.

This solution presents the following advantages:
1. a device is immediately identifiable from the address because it exactly represents the position in the rack. In case of malfunction, a specialist can immediately remove the device and replace it, because its physical position is immediately identifiable, as it coincides with its address;
2. the management is easily understandable by everyone.

However, this solution also presents numerous disadvantages:

1. if the address is generated by an analogue line
   a. each device has to reserve an analogue channel (which is very value, since typically there are not many of them in a micro-controller) to read the address,
   b. the more addresses are generated by the same line, the more precise the reading must be: if the line is used for 8 devices, the analogue range has to be divided by 8 and each section has to have safety ranges to avoid overlaps,
   c. the length of the wiring affects the impedance of the line and can change the level of the analogue signal read and hence the address,
   d. noise on the line and signal partitioning tolerances are not always negligible;
2. if the address is generated by a digital line and configured by means of dip-switches
   a. a considerable number of digital inputs must be used ($\log_2(\text{max\_addresses})+1$)
   b. an operator could make mistakes in configuring the rack, creating duplicated addresses;
3. both on the rack and on each unit, a signal bus has to be created for the sole purpose of providing a static address which, ideally, is read only once when the unit is turned on
4. both on the rack and on each unit, (costly) connectors have to be mounted for the sole purpose of transferring the static cell address to the device
5. if a device is removed and then quickly reinserted in another housing, if it did not turn off because of energy maintenance systems (bulk capacitors), it would maintain the address related to the previous housing, creating, even if only temporarily:
   a. a possible duplicated address (if for example a new device is inserted in the housing where the old one has just been removed),
   b. a mismatch between address and position.

SUMMARY OF THE INVENTION

According to one aspect, the object of the invention is to at least partly alleviate the aforementioned drawbacks.

Essentially, according to the invention a method is provided for assigning addresses to a plurality of electronic devices connected to a shared communication channel, in which, upon being turned on, each device generates and assigns itself an address included in a set containing a number of addresses that is equal to or greater than the number of devices connected to said channel.

The proposed solution enables completely to eliminate all reference to the static addressing, thereby removing all the related hardware part (address bus, connectors, digital or analogue pins of the micro-controller) and losing the address-position match. Each unit or device has to know only the highest number of devices, which may be present in the network. Each device assigns itself its own virtual address among the available ones and tries to communicate as if said address had been received from the rack through the conventional address bus.

In some embodiments, in order to prevent two devices from assigning themselves the same address, if the address generated by a second device has already been assigned previously by a first device connected to the communication channel, the second device performs a procedure for generating and assigning a new address.

In one embodiment, the devices communicate with each other through the shared communication channel according to a "democratic" logic, instead of behaving as "slave" devices with all communicating with a single master device (master-slave mode). In this operating mode, in some embodiments the method may comprise the following steps:

after being turned on and generating and assigning its own address, each device scans the time according to time quanta having substantially constant and predetermined duration;

each device uses, for the possible transmission of a message on the shared communication channel, a time quantum corresponding to its own address.

Hence, the devices require in this case to know exclusively the maximum number of devices connected to the network and the duration of the time quantum. These are the only items of information necessary to enable the dynamic assignment of the addresses when each device is turned on and hence the communication among devices in "democratic" mode.

In some embodiments, after being turned on and generating and assigning its own address, each device scans the time according to time quanta having substantially constant and predetermined duration, numbering them cyclically and sequentially from 0 to N, where N is a number equal to or greater than the total number of devices connected to the shared communication channel. Moreover, the device can transmit a message on the shared communication channel during a time quantum, whose sequential number matches its own address, generated and assigned in the way defined above.

In some preferred embodiments of the method according to the invention, each device that has to transmit a message on the shared communication channel, generates a time delay and starts the transmission during a time quantum, whose sequential number matches its own address, and after said time delay, if during said time delay the transmission channel is free. Advantageously, the time delay can be generated in random fashion and included between a maximum value and a minimum value.

In some embodiments, to align the time scan of the quanta of a given device to the time scan of the quanta of the other devices, the method may provide that if a first device (which has generated a first address) detects during a time quantum on the shared communication channel a message coming from a second device, whose address is different from the sequential number which the first device assigned to said time quantum, the first device changes the sequential number of the time quantum by attributing to it as the sequential number the address of the second device, which has transmitted its own message on the shared communication channel during said time quantum.

Additional advantageous characteristics of the method according to the invention shall be described hereafter and/or defined in the appended claims. The invention relates specifically to a method for managing the communication between multiple devices connected to a transmission channel, which comprises one or more of the rules, modes or characteristics described hereafter and in the appended claims.

The invention also relates to a system comprising a communication channel and a plurality of devices connected thereto, which operate according to the method defined above.

Moreover, the invention relates to a memory support with a software that implements a method of the type defined above with one or more of the characteristics described and/or claimed herein.

BRIEF DESCRIPTION OF THE DRAWINGS

The invention shall be better understood by following the description and the accompanying drawing, which shows practical non-limiting embodiments of the invention. More in particular, in the drawing:

FIG. 1 shows a diagram of a rack with a system for the static assignment of the addresses according to the prior art.

DETAILED DESCRIPTION OF AN EMBODIMENT OF THE INVENTION

Figure 2:
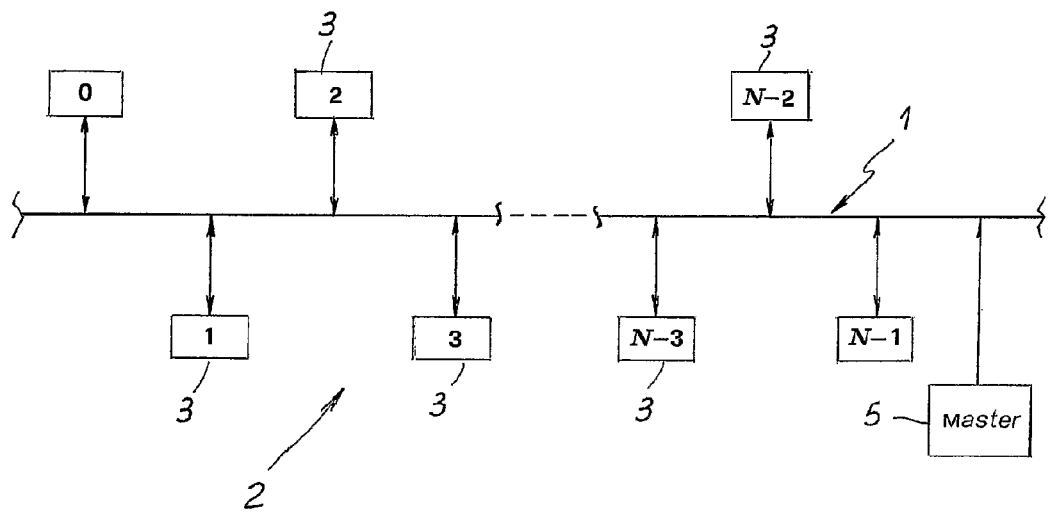
FIGS. 2 through 7 show time charts able to illustrate the procedures for assigning the addresses and for the time communication between devices according to the method of the present invention.

FIG. 2 schematically shows a generic system 2 comprising a transmission channel 1 whereto are connected N generic electronic devices, numbered from 0 to N−1, each indicated with the reference number 3, as well as an electronic device 5 indicated as "master".

Figure 3:
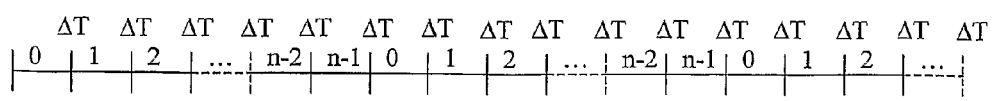

When each generic $i^{th}$ device 3 is turned on, it will generate an address ($A_i$) between 0 and N−1 (N being the maximum number of devices present) and it will start scanning the time according to time quanta (x) having constant and predetermined length ($\Delta T$). The time quanta and the scan thereof are obtained for example by means of the clock internal to the microprocessor of the generic device 3. The first time quantum will be identified as 0, the second one as 1 and so on until the $N^{th}$ time quantum, identified as N−1. The next one will again be identified as 0 and so on again to N−1. FIG. 3 schematically indicates the procedure for counting the time quanta by the generic $i^{th}$ device 3.

At this point, the devices can communicate following two philosophies:
1. in the usual master-slave technique, in which a controller takes the situation in hand and manages the system,
2. in "democratic" manner, exchanging data (e.g. temperatures, pressures, currents, voltages, various commands, etc.) among them with no need to have a controller.

Consider for example a power plant in which a group of rectifiers deliver current. The devices could autonomously exchange information on the current they are delivering to effect digital current sharing with no need for the controller to manage everything. Or in a cooling system in which the air temperature and pressure readings are exchange in order to cause the fans (cryogenic gases, oils, water . . . ) to have a shared management which depends on the whole state of the environment. In all these cases, a controller (master) can in any case be listening on the bus and intervene only in case of malfunction or upon external interrogation, whilst the devices communicate directly with each other in "democratic" mode by transmitting and receiving information on the communication channel, each device having a unique address. It must be understood that the general concepts underlying the invention can find application also in a system that provides solely a master-slave management, with a controller or master that controls the electronic devices hierarchically below it, or in a system that provides solely for a "democratic" type of management.

Management of Communication with "Democratic" Mode

The main rule for this mode of managing the communication between devices is that each device is authorized to communicate (i.e. to transmit data on the communication channel) in a given instant in time only if its own address is equal to the number of the time quantum present in that moment ($A_i$=x).

Figure 4:
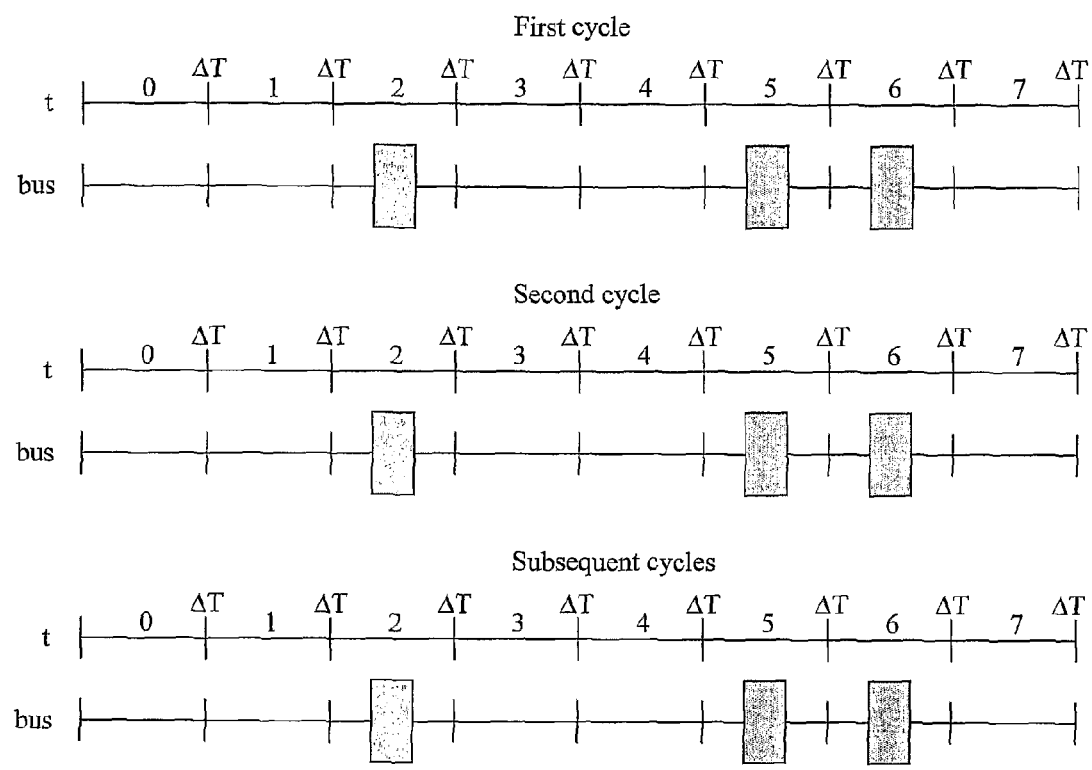

With reference to the diagram of FIG. 4, for the sake of simplicity let it be supposed that the maximum number of devices is 8 and that hence the addresses are from 0 to 7. Now let it be supposed that there are three devices present and that the addresses 2, 5 and 6 have been assigned thereto. The time diagram of the communication will thus be the one shown in FIG. 4, in which three successive scan cycles for scanning the time quanta from 0 to 7 are shown (each time quantum has duration ΔT). Each scan cycle has a duration 7*ΔT. Under the time scale is schematically shown the transmission bus. Since the addresses no. 2, 5 and 6 have been assigned, the device with address 2 may transmit on the communication bus during the time quantum 2, the device with address 5 will transmit on the bus during the time quantum no. 5 and the device with address 6 will communicate during the time quantum no. 6.

If each device has correctly assigned itself an address not coinciding with the address of other devices and if all devices are correctly synchronized, i.e. if the scan in time quanta for the various devices is synchronized for all devices, the transmission takes place correctly according to the simple rule defined above. Each device transmits on the channel during the time quantum corresponding to its own address and remaining listening on the channel it is able to receive all messages destined to its own (unique) address.

In some cases, however, one or more of the following problems may be encountered:
A. upon being turned on, two or more devices assign themselves the same address,
B. the devices "awaken" at different times and hence they have to manage an address that is potentially already assigned,
C. because of the tolerances of the components (quartz, ceramic resonator, circuit for the generation of the internal clock of the micro-controller, etc.) the time quanta ΔT are not perfectly equal among the various devices and hence there is a time drift phenomenon between a device and the other, which dangerously misaligns the communication,
D. a device may have the time misaligned from the start because of different turn-on and start-up times.

Hereafter possible manners of confronting and solving the aforementioned problems shall be described, if the system is affected by them. In order to solve all the mentioned problems, in a preferred embodiment of the invention the method shall adopt the following rules:
1. when a given device is turned on, all available addresses shall be considered free,
2. when they are turned on, all devices wait at least one complete time cycle (N*ΔT), or the receipt of a message from another device before trying to transmit,
3. when a communication takes place in the $k^{th}$ time slot or time quantum, then the address k is considered busy,
4. if for z (to be assigned during the design phase) consecutive times there is no communication in a slot k, then the address k is considered free,
5. if a device that has assigned itself the address k "sees" a communication in the slot or time quantum k, then the device "loses" the address and generates a new one among the free ones,
6. if a device sees a communication in the time slot or quantum k, but made by a device with address j, then the device will change the count of the time quanta and to the current time slot or quantum will be assigned the sequential number j and no longer k,
7. each device, before starting to transmit, will always check the channel in order to verify whether there is an ongoing communication, in which case it will immediately suspend the transmission,
8. each device that wants to transmit will start the communication after a time $T_i = \tau_i$ after the start of the time slot or quantum with $0 \leq \tau_i < T_1$
9. each device that wants to transmit, but that has just generated a new address, will start the communication after a time $T_i = T_2 + \tau_i$ from the start of the time slot, with $T_1 < T_2$
10. if a device has been able to transmit in the slot k it will consider the address k to be correctly assigned to itself.

$T_1$, $T_2$ and ΔT will have to be calculated during the design phase. If $T_M$ indicates the time duration of the longest message which can be generated in the democratic communication and $T_G$ indicates a non-nil guard time, which takes into consideration the tolerances of the devices and the possibility of an external management by a controller, then:

$$\Delta T > T_1 + T_2 + T_M + T_G.$$

The value of $T_1$ will also have to be large enough to enable the generation of a satisfactory variety of time delays.

Following the aforesaid rules, hereafter a description shall be provided of how to solve the four problems A-D which can occur in a system of device connected to the transmission channel.

Address Conflict

With reference to the simplified hypothesis of eight devices, let it be hypothesized that the addresses which the three devices present in the system assign themselves are 2, 2, 6, i.e. that two devices have assigned themselves the same address (address no. 2). Let G and V indicate the two devices that erroneously assigned themselves the same dynamic address 2. Hereafter, the letters G and V shall be used to indicate the quantities pertaining respectively to the devices G and V.

Figure 5:
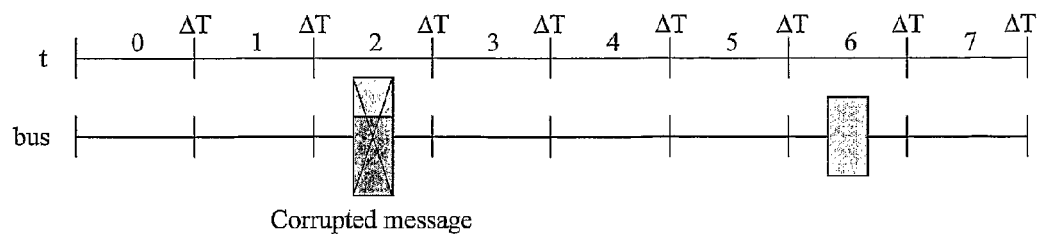

In this case, the two devices that have assigned themselves the same address could not communicate because the two messages would overlap: the two devices would both attempt to transmit their own messages on the transmission channel during the time quantum or slot no. 2. Moreover, the time slot or quantum no. 2 would in any case be unusable. The situation is schematically represented in FIG. 5.

Let's now analyze in greater detail the situation that takes place if the devices follow the ten rules 1-10 listed above, at the time when the time scan reaches (for all devices, which in this phase are assumed to be correctly aligned and synchronized) the time slot no. 2. When this takes place, the two devices that have assigned themselves the address no. 2 generate two random delays, respectively $\tau_G$ and $\tau_V$ according to rule 8. Since the time delays are random, it is presumed that $\tau_G$ is different from $\tau_V$. If only one of the two devices has already used that time slot in a previous cycle of counting the time slots or quanta, it will consider this address to be correctly assigned (rule 10). Vice versa, let it be supposed that the other device has just generated the address 2. Then the communication delays will respectively be $$T_G = \tau_G$$

$$T_V = \tau_V + T_2 \text{ (rule 9)}$$

$T_V > T_G$ whatever the value of $\tau_G$, $\tau_v$

Figure 6:
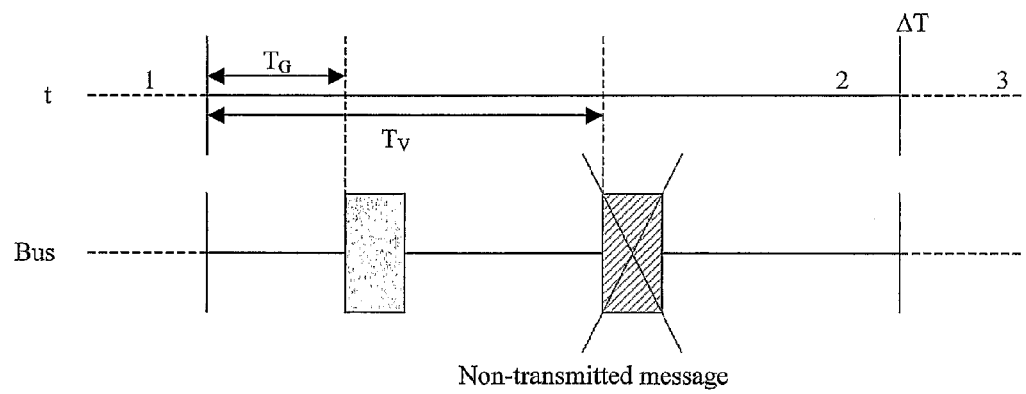

Hence the time diagram of the slot 2 alone will be the one shown in FIG. 6. The device V will never transmit its message (rule 7), it will lose its address (rule 5) and it will generate a new address considering the address 2 to be busy (rule 3). At the next cycle, the device V will have a new address and hence there will no longer be a possible conflict with the device G.

If both the devices are in the same state (both devices with just-generated address or already correctly assigned), the situation is similar.

Let us consider the difference between the two time delays generated by the two devices: $\delta t = |T_V - T_G|$ (whether the time $T_2$ is present or not in both addenda is obviously irrelevant). If δt is greater than the minimum time for the recognition of the presence of the device by the micro-controller of one of the two devices, then the device that tries to transmit second will see the channel occupied by the first device and hence the situation will again be the one described previously. If instead δt is too small, then the second device will not see the channel occupied and both will transmit and will consider the address as acquired (rule 10). From the viewpoint of the other devices, the time slot in question will be occupied by an unintelligible message which will thus be discarded. At the next cycle, when the time slot no. 2 returns, the two devices G and V will regenerate a random delay which is unlikely to be the same for both. In any case, sooner or later the St will be sufficiently large to assure the resolution of the conflict.

If the devices that generate the same address are a higher number, the algorithm will automatically make the selection: at every cycle, all those that are able to recognize the message of the fastest device automatically will be eliminated from the race to the slot until the last one left wins the contest.

Turn-on Misalignment

Figure 7:
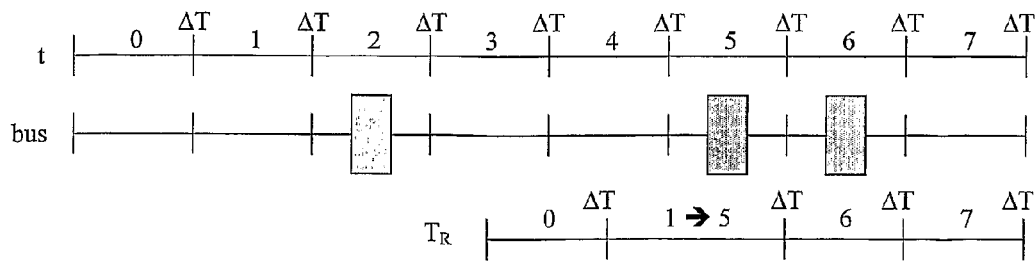

Let it be supposed that in the network of 8 time slots or quanta there are still three devices with the addresses stably and correctly assigned: 2, 5 and 6. These devices shall hereafter be indicated as G, V and B. Let it be supposed, moreover, that a fourth device (R) is inserted in the network at a random moment. The time line (i.e. the time scan) of this latter device will necessarily be not aligned to the theoretically stable one of the first three devices G, V and B. In other words, if the devices G, V and B are scanning the time with the same sequence of quanta, at a given instant all the devices G, V and B will be scanning the $j^{th}$ time quantum or slot, whilst the new device R, which is activated at a random instant, will start to count the time quanta or slots starting from 0, and hence not in synchrony with the other three. FIG. 7 schematically shows this situation. The first row represents the scan of the time quanta or slots by the three devices with the addresses 2, 5, 6 already assigned, which are mutually synchronized. The second row represents the transmission bus, and the third row represents the time scan of the slots or quanta by the fourth device R (time indicated as $t_R$), which starts (in the illustrated example) to scan the time at an intermediate instant during the time slot which for the other devices is the slot no. 3.

The new device R will generate a random address assuming that all the addresses are free (rule 1) and it will remain waiting for a complete time cycle (N*ΔT) before transmitting (rule 2). Because of this wait, the device R will very likely see at least one message before transmitting and will thus align (rule 6) the supposed time slot to the real one. In the example illustrated in FIG. 7, it is supposed that in the time slot no. 5 the device V, which has the address no. 5, transmits a message on the transmission channel or bus. Consequently, the fourth device R corrects the current time slot (no. 1) during which it detects on the transmission channel the message originating from the address device 5, assigning the number 5 to said time slot or quantum.

If for any reason the device R does not receive a valid message in a complete cycle, or otherwise before transmitting, then the other listening devices will align to the time line of the new one as soon as they detect on the transmission channel a message coming from the device R. If then all devices awaken at different times and hence with misaligned time lines but at such a time distance that no message transits before the last one is turned on, then the time line will automatically align on the one of the first device that transmitted a message on the channel.

In the final analysis, the rules 1-10 defined above allow to solve the problem of misalignment due to unsynchronized start-up of the devices.

Misalignment Due to Component Tolerance

No matter how perfected it may be, every electronic component has a tolerance so that it is impossible for two devices to be able to create perfectly identical time lines. ΔT will not be identical for all units, but rather each of them will have its own $\Delta T_i$. The difference $|\Delta T_i - \Delta T_j|$ may even be imponderable, but after a certain number K of complete cycle a misalignment will be obtained nonetheless, equal to $N*K*|\Delta T_i - \Delta T_j|$, which may not be negligible any longer. This misalignment, if excessive, could cause the communication described previously to fail. This depends, among other matters, on the degree of precision of the electronic devices.

At least two methods for recognizing the misalignment are identified:
1. Calculation of the time delay between the start of the time slot and that of the message. If this delay is not compatible with the times explained above (e.g., if a message arrives shortly before the start of the time slot), a misalignment exists;
2. within each message, the value of the calculated random time delay $T_j$ can be inserted. The device that receives the message can check the instant of reception of the message relative to the start of the time slot with this value and recognize any misalignment.

After a device recognizes the misalignment, a realignment procedure can be invoked (at least three are identified):
1. the device sends a message that invokes the realignment of the time lines with the start or the end of the message. In this case, the time slots of all the devices connected to the channel will start from the start or the end of the message;
2. the device sends a message that informs all devices connected to the channel that at the next message that circulates in the network the time slots will have to be aligned with the start or the end of the message itself;
3. each device proceeds to realign to each slot on the basis of the value $T_j$ the random delay inserted in the message.

Master-slave Communication Rules

Above, the democratic communication mode has been described, in which each device communicates with the others without a hierarchical order or a control by a master. In a different operating mode, the system can operate with a master-slave type of communication, in which a main device or master (the device 5 in the diagram of FIG. 2) serves as controller. Each device 3 is authorized to communicate, i.e. to transmit a message on the transmission channel 1, only if it is interrogated directly.

A controller can be installed on the same network as the devices, listen for the data traffic and retrieve the main operating information which can be provided to the exterior. "Democratic" communication can be sufficient for the proper operation of a device, but in general it is certainly not comprehensive. For example, and external user may need to read an event log, read or force a particular state of a device or of all the devices (fan speed, network voltage, current/voltage/power limitations, etc.), update the firmware of a unit, and so on. In this case, simply listening by the controller is no longer sufficient.

A controller or master must be able to introduce itself in the continuous exchange of data without creating misunderstandings or conflicts. Obviously, the controller as well, being in listening mode, must scan the time according to the time slots of the devices and perform the correct alignment procedures. In this way, if the controller transmits between the end of a message of a device and the end of the time slot (also exploiting the presence of the guard time $T_G$) it is sure not to create conflicts. In fact, in this time interval there must not be any message by any device.

At least two methods are identified, which can also be used simultaneously, for distinguishing a "democratic" message from a "master/slave" message:

1. the master device has an address that is not included among the possible addresses of the slave devices. In this case, the mere address of the sender of the message would identify the presence of the master;
2. the master uses a particular set of commands which it alone is authorized to use. In this case, it can use an address that—in the case of "democratic" communication—is used by one of the slave devices. When the system returns to the "democratic" communication mode, the address becomes available again, after some cycles, for the slave devices.

The recognition of a message of a master automatically causes the shift from "democratic" to "master/slave" mode. In this state, the slave devices (indicated with the number 3 in FIG. 2) are silent until they are directly interrogated by the master device 5, in which case they reply.

To return to the "democratic" mode, at least three methods are identified:

1. timeout: after messages fail to arrive from a master device for a certain time, the slave devices automatically start communicating in "democratic" mode. The expiration of the time is used by all as a new basis of the times for slot communication, i.e. for scanning the time quanta;
2. command: the master sends a command that invites the slave devices connected to the transmission channel to switch to this mode. The instant of reception of the new message is used by all as the new basis of the times for slot communication, i.e. for scanning the time quanta;
3. arrival of a "democratic" message. From that moment onwards, the standard rules of slot communication are followed as if there had never been a master. The time basis will obviously be aligned with that of the device that made the transmission.

In the master-slave communication mode, similar address conflict problems may arise. It may occur that when it is turned on, the controller or master needs to interrogate the slave units or devices before they start the automated operation. It is, as always, possible that two or more devices generate the same address. In this case, however, the devices can speak only if interrogated by the master and hence the conflict arises only in that case. Although there are no time slots, each interrogated device replies applying a random delay, calculated with the same criteria as for "democratic" communication. In this way, the conflict can be handled with the same rules described previously.

Vice versa, in the operation with master-slave communication the time slot management is no longer taken into consideration and therefore there no longer are any problems with misalignment of the time lines.

Recognition of a Device

As stated previously, the system for the dynamic assignment of addresses, described above, was devised to the detriment of a bi-univocal address-position relationship. Since each device generates and assigns itself an address in a dynamic manner, there is no correspondence between the address of the device and its position in space, e.g. in a rack. Therefore, there is no chance to discover, merely examining the address, which device has that specific address, from which device any particular data come, but above all which device has a specific alarm.

Overcoming this problem is useful for a good management of the devices.

Some embodiments provide, for this purpose, for fitting each device with a signaling system (acoustic, visual, or of a different kind), which can be activated by the master device. In this way, the controller could send a command to a device having the generic address J, to activate the signaling system. This allows, for example a maintenance person, to locate the device with the generic address J, whereon a malfunction has been signaled, through the acoustic, visual, or other form of signal, and hence to intervene on the device itself.

The invention claimed is:

1. A method for assigning addresses to a plurality of electronic devices connected to a shared communication channel through which said devices communicate with each other, the method comprising:
   each device, upon being turned on generating and assigning itself an address included in a set containing a number of addresses that is equal to or greater than the number of devices connected to said channel; and
   each device, after being turned on and generating and assigning its own address, scanning the time according to time quanta having substantially constant and predetermined duration, each device using, for the possible transmission of a message on said shared communication channel, a time quantum corresponding to its own address.

2. Method as claimed in claim 1, wherein, if the address generated by a second device has already been assigned previously by a first device connected to the communication channel, the method further comprising performing, by said second device, a procedure for generating and assigning a new address.

3. Method as claimed in claim 1, wherein when a device has to transmit a message on said shared communication channel, before it starts transmitting, the method further comprising said device verifying that the communication channel is free and transmitting the message after a time delay if the transmission channel was found to be free during said time delay.

4. Method as claimed in claim 2, wherein, when a device has to transmit a message on said shared communication channel, before it starts transmitting, the method further comprising said device verifying that the communication channel is free and transmitting the message after a time delay if the transmission channel was found to be free during said time delay.

5. Method as claimed in claim 1, further comprising:
   after being turned on and generating and assigning its own address, each device scanning the time according to time quanta having substantially constant and predetermined duration, numbering them cyclically and sequentially from 0 to N, where N is a number equal to or greater than the total number of devices connected to the shared communication channel; and wherein said device transmits, if necessary, a message on the shared communication channel during a time quantum, whose sequential number matches its own address.

6. Method as claimed in claim 1, further comprising each device that has to transmit a message on the shared communication channel generating a time delay and starts the transmission during a time quantum, whose sequential number matches its own address, after said time delay, if during said time delay the transmission channel is free.

7. Method as claimed in claim 5, wherein said time delay is a time delay generated in random fashion and included between a maximum value and a minimum value.

8. Method as claimed in claim 1, wherein if a first device that generated a first address detects, during a time quantum, on the shared communication channel, a message coming from a second device, whose address is different from the sequential number that the first device assigned to said time quantum, the method further comprising the first device changing the sequential number of the time quantum, attributing to it as the sequential number the address of the second device, which transmitted its own message on the shared communication channel during said time quantum.

9. Method as claimed in claim 1, further comprising:
each device that has to transmit for the first time a message on said shared communication channel, in a time quantum defined by its own address, transmitting the message with a total time delay given by the sum of a predetermined time delay and of a random time delay, if during the total time delay the shared transmission channel is free.

10. Method as claimed in claim 1, wherein if during a time quantum corresponding to its own address a device detects a message on the shared communication channel, the method further comprising said device detecting a message on the shared communication channel, said device losing its own address and performing a new procedure for generating and assigning a new address.

11. Method as claimed in claim 1, wherein said time quantum has a duration equal at least to the longest time delay with which a device starts transmitting its own message on the shared communication channel, summed to the longest duration that a message transmitted on said channel can have.

12. Method as claimed in claim 11, wherein said time quantum is increased, relative to the sum of the longest duration of the time delay and of the message, by a guard time interval.

13. Method as claimed in claim 1, wherein in case of misalignment between time scans of two or more devices, the method further comprising performing a time alignment procedure.

14. Method as claimed in claim 1, wherein on said shared communication channel are transmitted messages coming from a master unit, the method further comprising said devices connected to said shared communication channel behaving as slave units.

15. Method as claimed in claim 14, further comprising switching said devices from a master-slave communication mode to a mode of inter-communication with the remaining devices and vice versa.

16. Method as claimed in claim 1, wherein in order to identify a given device, the method further comprising sending an identification command on the shared communication channel by a master unit.

17. Method as claimed in claim 16, wherein said identification command contains the address of the device to be identified.

18. Method as claimed in claim 16, said identification command causing the generation by the device of a signal which an operator can perceive.

19. An electronic device configured for connection to a shared communication channel and for communicating with a number of other devices connected to said shared communication channel, said electronic device further comprising a memory support and software,
wherein said memory support and software are effective to
cause said electronic device, upon being turned, to generate and assign itself an address that is included in a set containing a number of addresses that is equal to or greater than the number of devices connected to said shared communication channel,
cause said electronic device, after the device has assigned its own address, to scan a time according to time quanta having substantially constant and predetermined duration, and
cause said electronic device to use, for the possible transmission of a message on said shared communication channel, a time quantum corresponding to its own address.

20. An electronic communication system comprising:
a shared communication channel;
a plurality of electronic devices functionally coupled to said shared communication channel;
wherein at least some of said plurality of electronic devices each comprise software effective to
cause said electronic device, upon being turned, to generate and assign itself an address that is included in a set containing a number of addresses that is equal to or greater than the number of devices coupled to said shared communication channel,
cause said electronic device, after the device has assigned its own address, to scan a time according to time quanta having substantially constant and predetermined duration, and
cause said electronic device to use, for the possible transmission of a message on said shared communication channel, a time quantum corresponding to its own address.

* * * * *